May 17, 1938. T. D. BATESON 2,117,393
LAWN MOWER
Filed Dec. 15, 1937
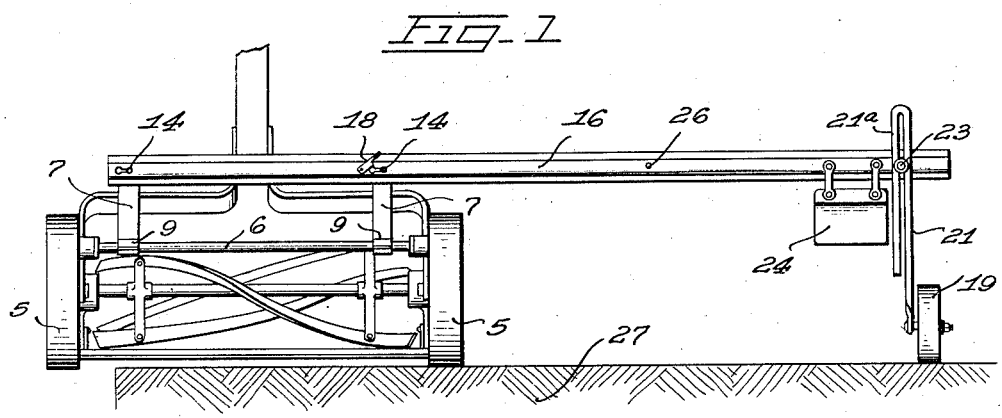
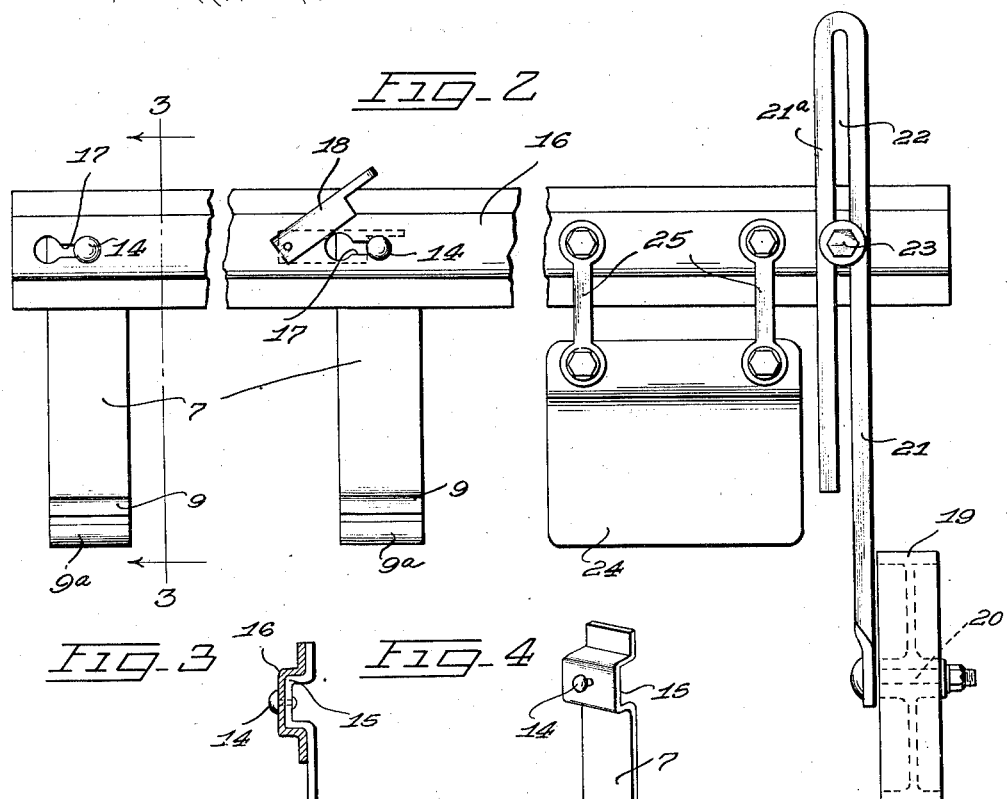
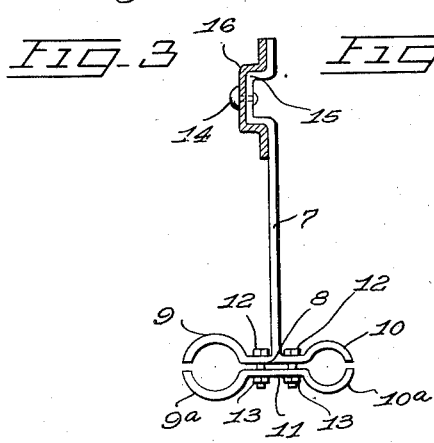
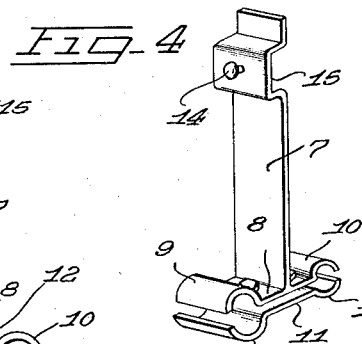
Inventor
Tom D. Bateson.
By Eugene E. Stevens
His Attorney Patented May 17, 1938

2,117,393

UNITED STATES PATENT OFFICE 2,117,393

LAWN MOWER

Tom Duckworth Bateson, Victoria, British Columbia, Canada

Application December 15, 1937, Serial No. 180,000

8 Claims. (Cl. 56—249)

This invention relates to lawn mowers of the hand operated, side wheel driven type.

An object of the invention is to provide an attachment capable of ready association with a lawn mower whereby the mower is counterbalanced so that when it is operated along the edge of a lawn with a portion overhanging the edge, the cut will be maintained at the level of the previous cut and the driving wheels of the mower will be maintained at the horizontal.

Another object is to provide an attachment for lawn mowers whereby when a mower is operated with a portion thereof overhanging the edge of a lawn, the overhanging portion will be prevented from tilting.

With these, and such other objects in view as will be apparent from the description, my invention resides in the novel combination, construction and arrangement of parts hereinafter described and claimed; it being understood that the present disclosure is not to be taken in a limiting sense and that any desired changes and variations may be made in the structural details of the invention, as will fall within its scope as claimed.

In the drawing:—

Figure 1 is a front elevation of a lawn mower equipped with my invention and as operated along the edge of a lawn to be cut.

Figure 2 is substantially an enlarged front elevation of the level-maintaining attachment employed.

Figure 3 is a vertical section taken on the line 3—3 of Figure 2.

Figure 4 is a perspective view illustrating the details of a supporting standard.

The invention is shown as associated with a hand operated lawn mower of the conventional type driven by side wheels 5 carried in the usual manner on side frames connected by the usual front tie rod 6.

The attachment consists of a pair of vertical standards 7 each of which is formed with an integral foot 8 extending laterally from opposite sides of the standard, the foot on each side of the standard being formed substantially as one-half of a split sleeve clamp, the clamp portion 9 at one side being of a size different from the clamp portion 10 on the other side, in order to accommodate the attachment of the standards to tie rods of different sizes. A clamping plate 11, corresponding to the foot 8 is provided with integral clamp portions 9a and 10a, respectively complemental to the clamp portions 9 and 10 of the foot 8, is associated with the foot 8 by means of a pair of bolts 12 carrying nuts 13 threaded thereover by which, as the nuts are tightened, the plate 11 is clamped against the foot 8. As shown in Figure 1, each standard 7 is clamped into position adjacent an end of the tie rod 6 with the rod engaged in either of the clamps 9—9a or 10—10a depending on the size of the tie rod.

Each standard 7 is provided adjacent its upper end with a laterally extended headed stud 14, preferably disposed in a laterally extended portion 15 of the standard.

In service the standards 7 are generally more or less permanently associated with the tie rod the shanks of the standards being disposed in the same vertical plane with their studs 14 directed forwardly of the mower.

The pair of standards 7 provide spaced supports extending above the tie rods 6 and which are adapted to mount a bar 16 having a length sufficient to dispose one end considerably to one side of the mower when the bar is attached to the supporting standard as shown in Figure 1. The bar 16 is, in the embodiment shown, of substantially channel shape to take over the complemental channel shaped lateral extension 15 of each supporting standard. At one end portion the bar is further provided with a pair of key-hole slots 17 adapted to take over the headed studs 14 of the standards in the usual manner of such attachment. The bar further carries a pivoted latch element 18 adjacent one of the key-hole slots and operable for latching engagement behind one of the standard studs 14 when the bar is moved to locate the shank of the stud in the narrow portion of the key-hole slots, thus preventing disengagement of the bar from its supporting standard until the latch 16 has been released.

At its free end the bar 16 mounts a vertically adjustable ground wheel 19 journaled on a stub shaft assembly 20 carried by the lower end of an upright standard 21 provided with a longitudinal slot 22 which plays over the shank of a clamping bolt 23 carried by the bar and by which the standard 21 may be clamped in any set position with respect to the bar, the ground wheel 19 being vertically adjustable with respect to the bar. In the embodiment disclosed, the standard 21 comprises a metal strap having a portion 21a bent reversely upon itself in the plane of the portion 21 and in parallel spaced relation thereto to provide the slots 22.

At its end adjacent the point of attachment of the ground wheel standards 21, the bar 16 has fixed thereto a weight 24. The leverage exerted by the weight 24 on the bar 16 is normally sufficient to counterbalance the mower on the inner side driving wheel 5 as a fulcrum. In the embodiment herein shown the weight is detachably suspended from the bar 16 by detachable links 25, respectively bolted to the bar and to the weight. If desired, the weight may be made an integral part of the bar 16 or may be attached thereto in any desired manner.

The bar 16 is further provided inwardly of its free end with a bolt hole 26 providing means by which the ground wheel supporting standards 21 may be positioned on the bar inwardly of the weight 24 when desired.

In service, the parts are assembled as shown in Figure 1, the bar 16 being anchored in position on the supporting standard 7 with its free end extending inwardly of the mower relative to the outside edge of the lawn 27. The height of the ground wheel 19 is adjusted in the horizontal plane of the mower wheels 5 so that there is in effect provided a mower having a three-point ground wheel bearing contact. When the mower is operated along the edge of the lawn 27 with the outside portion overhanging the lawn edge, the two-point bearing afforded by the inner wheel 5 and the ground wheel 19 will maintain the horizontal level of the mower and the body of the mower will be restrained against tilting, so that the edge of the lawn will be given an even cut and at the same level as the major portion of the lawn surface. In this operation the weight 24 counterbalances the mower so that the normally unequal distribution of pressure occurring as the mower is pushed along the edge of the lawn will be compensated and the body of the mower will retain its horizontal level. Likewise, the presence of the ground wheel 19 assures against any inward tilting of the mower pivoting on the fulcrum afforded by the inner driving wheel 5.

I claim:

1. In combination with a lawn mower having side driving wheels and a tie rod extending therebetween, upright supports fixed to said tie rod, a bar carried by said supports extending laterally at one side of the mower substantially parallel to the axis of the mower wheels, and said bar being weighted at its free end.

2. In combination with a lawn mower having side driving wheels and a tie rod extending therebetween, upright supports fixed to said tie rod, a bar attached at one end to said supports and extending laterally beyond one side of the mower substantially parallel to the axis of its wheels, a weight carried by said bar adjacent its free end, and a ground bearing wheel vertically adjustable on said bar adjacent the free end portion.

3. In combination with a lawn mower having side driving wheels and a tie rod extending therebetween, a pair of upright standards detachably secured to said tie rod, a bar detachably engageable with the upper end of said standards and extending laterally beyond one side of the mower substantially parallel to the axis of its wheels, a weight carried by the free end portion of said bar, and a ground bearing wheel having a standard vertically adjustable on said bar, said standard being detachably engaged with said bar and capable of adjustment longitudinally thereof.

4. A lawn mower attachment comprising member adapted to be secured to a lawn mower, a horizontally disposed counterbalanced rod carried by said clamping member and extending laterally from one side of the mower, a counterbalance weight carried by the other end of said bar, and a ground bearing wheel carried by the free end of said bar.

5. In combination with a lawn mower, a counterbalance bar, means for rigidly securing one end of said bar to said mower whereby to project the other end laterally beyond one side of the mower, and a counterbalance weight carried by the free end portion of said bar.

6. In combination with a lawn mower, a counterbalance bar, means for rigidly attaching one end of said bar to said mower with the free end of the bar extending laterally beyond one side of the mower, and a ground bearing wheel vertically adjustable on the free end portion of said bar.

7. In combination with a lawn mower having a tie rod, a pair of standards adapted to be clamped to said rod to extend vertically in a common plane, studs carried by the upper end of the standards, a counterbalance bar having slots in one end portion thereof for engagement over said standard carried studs, means for latching said bar in attached position over said studs, a weight carried by the free end portion of said bar, and a ground bearing wheel vertically adjustable on said bar at one side of the mower.

8. A lawn mower counterbalancing attachment comprising in combination, supporting standard means adapted to be attached to a mower, a counterbalance bar detachably engageable with said standard means to extend laterally from one side of the mower, and said bar being weighted at its free end portion to counterbalance the mower on one of its wheels as a fulcrum.

TOM DUCKWORTH BATESON.